United States Patent [19]

Suzuki

[11] Patent Number: 4,549,220
[45] Date of Patent: Oct. 22, 1985

[54] APPARATUS FOR PROCESSING IMAGE INTO BINARY DATA

[75] Inventor: Kazuhiro Suzuki, Shizuoka, Japan, now by change of name from Kazuhiro Watai

[73] Assignee: Ricoh Company, Ltd., Tokyo, Japan

[21] Appl. No.: 471,111

[22] Filed: Mar. 1, 1983

[30] Foreign Application Priority Data

Mar. 10, 1982 [JP]  Japan ................................. 57-37549

[51] Int. Cl.⁴ ............................................. H04N 1/40
[52] U.S. Cl. .................................... 358/283; 358/282
[58] Field of Search ........................ 358/284, 282, 283

[56] References Cited

U.S. PATENT DOCUMENTS

| 4,366,507 | 12/1982 | Mori ..................................... 358/283 |
| 4,446,486 | 5/1984 | Itoh ...................................... 358/282 |
| 4,447,830 | 5/1984 | Stoffel ................................... 358/283 |
| 4,468,703 | 8/1984 | Fujiwara .............................. 358/282 |

Primary Examiner—Howard W. Britton
Attorney, Agent, or Firm—David G. Alexander

[57] ABSTRACT

An apparatus for processing an image into binary data is selectively operable with a fixed threshold level and a variable dither threshold level. When a threshold level commmand signal specifies the dither threshold level, a switchover means detects image data read from a character or like black-white image portion on an original document and specific part of a halftone image portion which is approximate in density level to black. The detection output forcibly changes the threshold level command signal from a dither threshold level command to a fixed threshold level command. The dither processing, therefore, occurs only for a minimum necessary halftone image portion in accordance with an image condition on the document.

4 Claims, 7 Drawing Figures

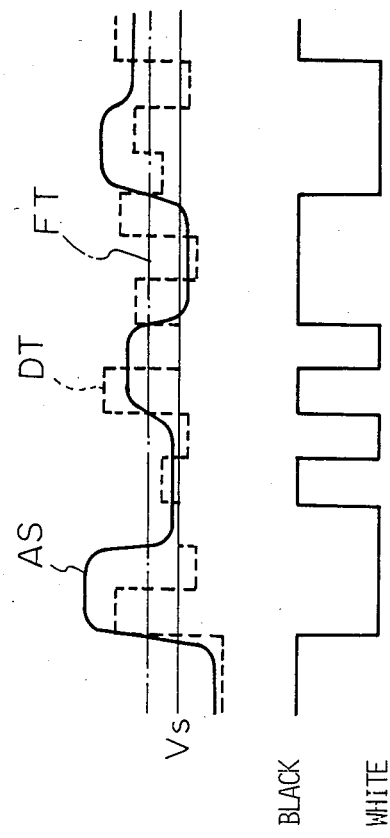

APPARATUS FOR PROCESSING IMAGE INTO BINARY DATA

BACKGROUND OF THE INVENTION

The present invention relates to an apparatus for processing image data read by a scanner or the like from an original document into binary data.

Generally, image data (analog signal) read by a scanner from a document is compared with a threshold level to be converted into binary data. A prior art apparatus designed for this operation fixes the threshold level at a predetermined value when the image on the document is a character, a figure or like black-white image, while rendering the threshold variable in response to a change in the image density level when the image is a photograph or the like which involves halftone. The variable threshold level well reproduces the halftone and a procedure using such a threshold level is usually referred to as the dither method.

With this type of apparatus, the operator enters a threshold level command signal which selects either a fixed threshold level or a dither threshold level. A comparator compares a level of analog image data read by the scanner with the selected threshold level. The output of the comparator will be low or white level when the voltage level of the image data is higher than the threshold level and high or black level when otherwise, whereby the image data is converted into binary data.

The selection of the dither threshold level or the fixed threshold level relies on the operator's decision which is made by observing images page by page. Once the operator specifies the dither threshold level, the whole page will be processed by the dither method resulting in a substantial amount of high or black level data. Then, a facsimile apparatus, for example, will consume a prohibitive period of time for the transmission of such an amount of binary image data after compressing them.

SUMMARY OF THE INVENTION

It is an object of the present invention to provide an apparatus for processing an image into binary data which effects efficient dither processing in accordance with a condition of an image on an original document.

It is another object of the present invention to provide an apparatus for processing an image into binary data which desirably reproduces halftone of an image on an original document and effectively suppresses an increase in the amount of binary image data.

It is another object of the present invention to provide an apparatus for processing an image into binary data which shortens the period of time required for the transmission of coded image data.

It is another object of the present invention to provide a generally improved apparatus for processing an image into binary data.

An apparatus for processing an analog image data signal into a binary image data signal embodying the present invention includes a switch means for selecting one threshold level out of a plurality of threshold levels in response to a command contained in a threshold level command signal. The threshold levels include at least a constant threshold level and a variable threshold level. A comparator means compares a level of the analog image data signal with one of the threshold levels selected by the switch means and selectively delivers two signals of different levels in dependence upon the result of the comparison. A specified threshold level changing means compares a level of the analog image data signal with the level of a predetermined reference signal and changes the command contained in the threshold level command signal from a variable threshold level command into a constant threshold level command only when the image data signal level is higher than the reference signal level and the command is the variable threshold level command.

In accordance with the present invention, an apparatus for processing an image into binary data is selectively operable with a fixed threshold level and a variable dither threshold level. When a threshold level command signal specifies the dither threshold level, a switchover means detects image data read from a character or like black-white image portion on an original document and specific part of a halftone image portion which is approximate in density level to black. The detection output forcibly changes the threshold level command signal from a dither threshold level command to a fixed threshold level command. The dither processing, therefore, occurs only for a minimum necessary halftone image portion in accordance with an image condition on the document.

Other objects features and advantages, together with the foregoing, are attained in the embodiments described in the following description and illustrated in the accompanying drawings.

BRIEF DESCRIPTION OF THE DRAWINGS

FIG. 2a is a diagram showing a relationship between analog image data and fixed and dither threshold levels provided by the prior art apparatus shown in FIG. 1;

FIGS. 2b and 2c are diagrams of image data which are respectively processed with respect to the fixed threshold level and dither threshold level each shown in FIG. 2a;

FIG. 4a is a diagram representing a relationship between analog image data and a reference voltage, fixed threshold level and dither threshold level attainable with the embodiment shown in FIG. 3; and FIG. 4b is a diagram indicating binary image data provided by the dither processing in accordance with the present invention.

DESCRIPTION OF THE PREFERRED EMBODIMENT

While the apparatus for processing an image into binary data of the present invention is susceptible of numerous physical embodiments, depending upon the environment and requirements of use, a substantial number of the herein shown and described embodiment have been made, tested and used, and all have performed in an eminently satisfactory manner.

Figure 1:
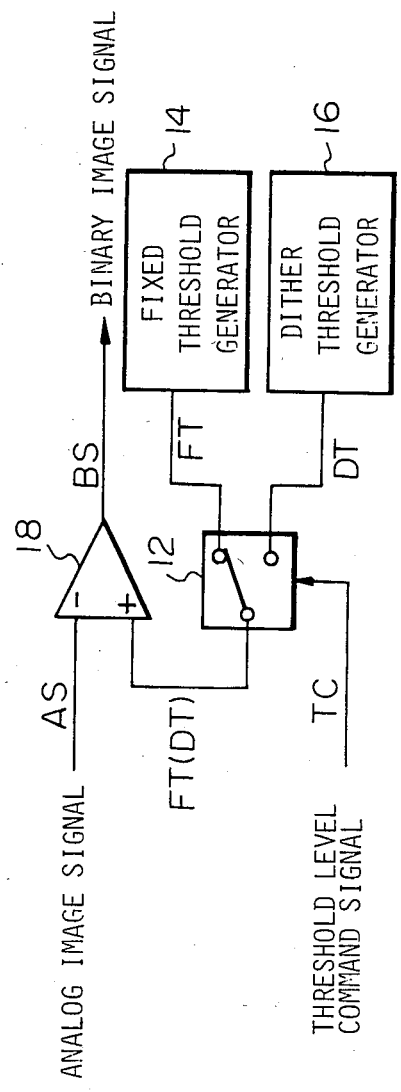
FIG. 1 is a block diagram of a prior art apparatus for processing an image into binary data.

To facilitate understanding of the present invention, a brief reference will be made to a prior art apparatus for the conversion of an image into binary data, depicted in FIG. 1. As shown, the apparatus generally designated by the reference numeral 10 comprises a threshold level changeover switch 12 adapted to select a fixed threshold level generator 14 or a dither threshold level generator 16, depending upon the threshold level command signal TC entered by operator's manipulation. The fixed threshold level generator 14 generates a fixed threshold level signal FT and the dither threshold level generator 16, a dither threshold level signal DT. A comparator 18 compares with the signal FT or DT an analog image signal AS which has been read by a scanner (not shown) and undergone shaping and like processings, thereby delivering a desired binary image data signal BS.

Figures 2A, 2B, 2C:
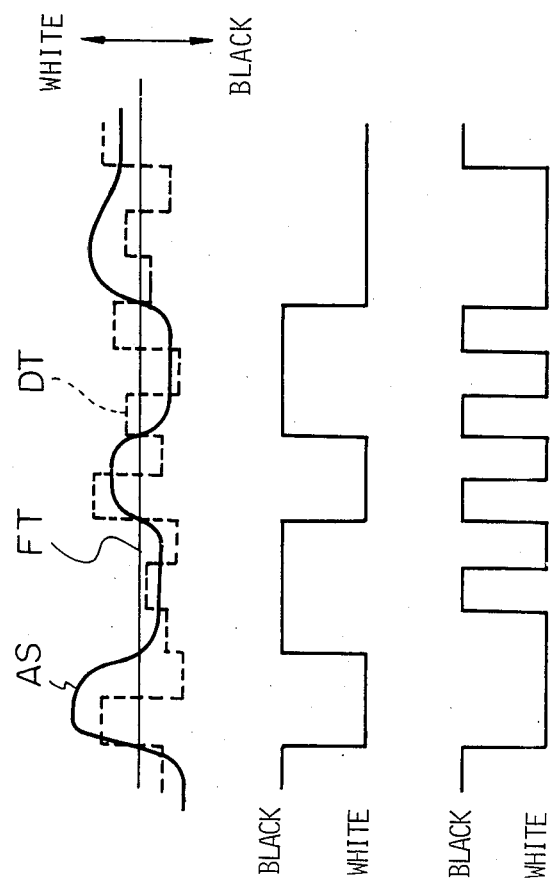

In operation, the switch 12 selects the fixed threshold level generator 14 when the threshold level command signal TC is low level and the dither threshold level generator 16 when the signal TC is high level. The comparator 18 thus determines a threshold level voltage which matches with a specific image condition on the document. The comparator 18 compares a voltage level of the image signal AS with the selected threshold level FT or DT. The comparison output is low or white level when the level of the signal AS is higher than the threshold level and high or black level when otherwise. Waveform shown in FIG. 2a represents the relationship between the analog image signal AS and the fixed and dither threshold levels FT and DT, waveform shown in FIG. 2b a signal provided by processing the signal AS with respect to the fixed threshold level FT, and waveform shown in FIG. 2c a signal provided by processing the signal AS with respect to the dither threshold level DT.

The prior art apparatus constructed and operated as described above is not fully acceptable due to the previously discussed problems. The present invention is successful to eliminate such problems and will now be described with reference to FIGS. 3 and 4.

Figure 3:
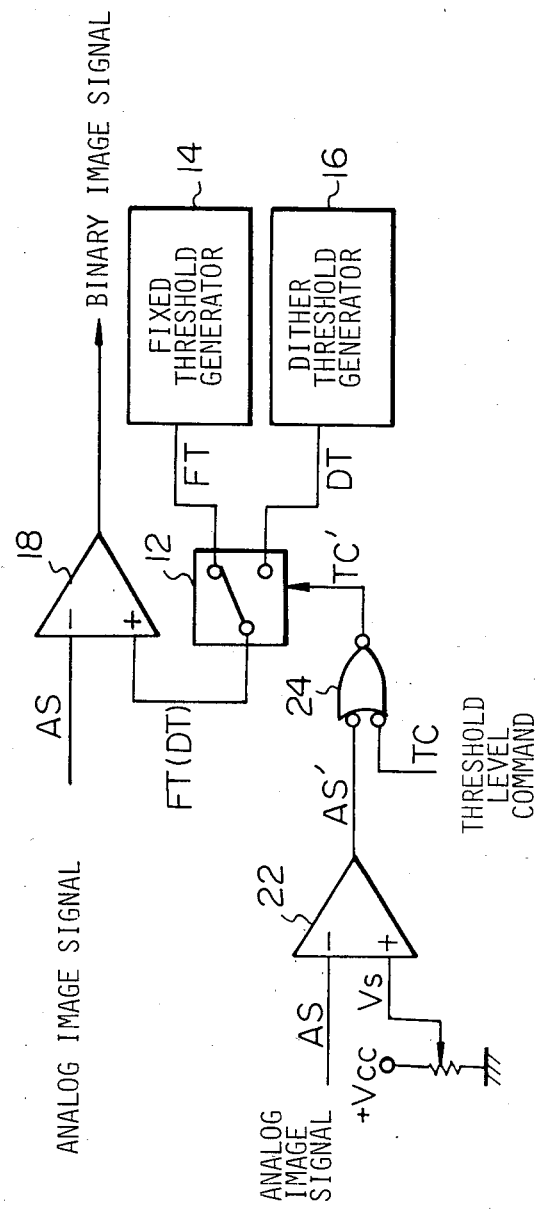
FIG. 3 is a block diagram of an apparatus for processing an image into binary data embodying the present invention.

Referring to FIG. 3, an apparatus embodying the present invention is shown and generally designated by the reference numeral 20. The apparatus comprises a second comparator 22 and an OR gate 24 in addition to the change-over switch 12, fixed threshold level generator 14, dither threshold level generator 16 and comparator 18. The second comparator 22 compares the analog image data signal AS with a predetermined reference voltage $V_s$ so as to detect image data in a black-white image portion and a specific area of a halftone image portion which resembles black in density level. The output AS' of the comparator 22 is fed to one input of the OR gate 24 which receives the threshold level command signal TC at the other input thereof. The OR gate 24 thus forcibly switches over the threshold level signals FT and DT from one to the other in response to the threshold level command signal TC.

The apparatus 20 having the above construction will be operated as follows.

When the threshold level command signal TC is low level to specify the fixed threshold level generator 14, the output TC' of the OR gate 24 remains low level regardless of the output AS' of the comparator 22 so that the switch 12 selects the fixed threshold level generator 14. On the other hand, when the threshold level command signal TC is high level to designate the dither threshold level generator 16 and if this occurs while the voltage AS coupled to the comparator 22 is lower in level than the reference voltage $V_s$, the output TC' of the OR gate 24 becomes high level causing the switch 12 to select the dither threshold level generator 16. If the output AS' of the comparator 22 becomes low level when the voltage AS is higher than the reference voltage $V_s$, the output TC' of the OR gate 24 becomes low level allowing the switch 12 to select the fixed threshold level generator 14. FIG. 4a illustrates the relationship between the analog image data signal AS and the reference voltage $V_s$, dither threshold level DT and fixed threshold level FT. Binary image data will appear as shown in FIG. 4b when the threshold level command signal TC is high level.

In summary, it will be seen that the present invention provides an apparatus for processing analog image data into binary data which minimizes the proportion of a halftone image to be subjected to dither processing even though such a processing may be designated by the operator. The ordinary fixed threshold level is allocated to a black-white image portion such as charaters and specific part of a halftone image portion whose density level is approximate to the black level. This outstanding advantage is achievable merely by employing an optimum reference voltage $V_s$.

Various modifications will become possible for those skilled in the art after receiving the teachings of the present disclosure without departing from the scope thereof.

What is claimed is:

1. An apparatus for processing an analog image data signal into a binary image data signal, comprising:
a switch means for selecting one threshold level out of a plurality of threshold levels in response to a command contained in a threshold level command signal, said threshold levels including at least a constant threshold level and a variable threshold level;
a comparator means for comparing a level of the analog image data signal with one of the threshold levels selected by the switch means and selectively delivering two signals of different levels in dependence upon the result of the comparison; and
a specified threshold level changing means for comparing a level of the analog image data signal with the level of a predetermined reference signal and changing the command contained in the threshold level command signal from a variable threshold level command into a constant threshold level command only when the image data signal level is higher than the reference signal level and the command is the variable threshold level command.

2. An apparatus as claimed in claim 1, in which the variable threshold level is a dither threshold level.

3. An apparatus as claimed in claim 2, in which the specified threshold level changing means comprises:
a second comparator means for comparing a level of the analog image data signal with the level of the reference signal and generating a first signal when the image data signal level is higher than the reference signal level and a second signal when the image data signal level is lower than the reference signal level; and
a switchover means for supplying the switch means with the fixed threshold level command in response to one of the first and second signals output from the second comparator means and the threshold level command signal, regardless of the output of the second comparator means when the threshold level command is the fixed threshold level command, said switchover means replacing the dither threshold level command by the fixed threshold level command when the threshold level command is the dither threshold level command and only when the output of the second comparator means is the first signal.

4. An apparatus as claimed in claim 3, in which the switchover means comprises an OR gate.

* * * * *